United States Patent [19]

Haas et al.

[11] 3,803,050

[45] Apr. 9, 1974

[54] LIQUID CRYSTALLINE COMPOSITIONS AND IMAGING SYSTEMS

[75] Inventors: Werner E. L. Haas, Webster; James E. Adams, Ontario; Bela Mechlowitz, Rochester, all of N.Y.

[73] Assignee: Xerox Corporation, Stamford, Conn.

[22] Filed: Aug. 20, 1971

[21] Appl. No.: 173,532

[52] U.S. Cl............................ 252/408, 350/160 LC
[51] Int. Cl. .............................................. G02f 1/16
[58] Field of Search ............... 350/160 LC; 252/408

[56] References Cited
UNITED STATES PATENTS

| 3,687,515 | 8/1972 | Haas et al. ........................... 350/150 |
| 3,597,043 | 8/1971 | Dreyer................. 350/149 |
| 3,656,834 | 4/1972 | Haller et al. ......................... 350/150 |
| 3,642,348 | 2/1972 | Wysocki et al. ............... 350/160 LC |
| 3,652,148 | 3/1972 | Wysocki et al. ..................... 350/150 |
| 3,666,948 | 5/1972 | Mechlowitz et al................ 250/83 R |

OTHER PUBLICATIONS

Haas et al.: "New Electro–Optic Effect in a Room–Temperature Nematic Liquid Crystal," Physical Review Letter, Vol. 25, Nov. 9, 1970, pp. 1326–1327

Primary Examiner—Edward S. Bauer
Attorney, Agent, or Firm—James J. Ralabate; David C. Petre; Gaetano D. Maccarone

[57] ABSTRACT

Novel liquid crystalline compositions containing an advantageous aligning agent resin, which causes said compositions, upon application to any suitable substrate to spontaneously align or to have a greater tendency to become aligned in an orientation wherein major axes of the molecules comprising liquid crystalline material are substantially perpendicular to the plane of the substrate. Such liquid crystalline compositions are particularly suited for use in phase transition systems wherein a film comprising cholesteric liquid crystalline material having the tendency to align is transformed to the nematic liquid crystalline state by the application of electrical fields of sufficient field strengths. Such compositions are also used in other liquid crystalline imaging systems making use of differentially aligned portions of liquid crystalline films.

6 Claims, 10 Drawing Figures

PATENTED APR 9 1974  3,803,050

INVENTORS,
WERNER E. L. HAAS
JAMES E. ADAMS, JR.
BY BELA MECHLOWITZ

J. D. Maccarone

ATTORNEY

PATENTED APR 9 1974 3,803,050

LIQUID CRYSTALLINE COMPOSITIONS AND IMAGING SYSTEMS

BACKGROUND OF THE INVENTION

This invention relates to liquid crystalline compositions and imaging systems, and more specifically to liquid crystalline compositions including an aligning agent which causes films of such compositions to spontaneously align when applied to a suitable substrate. Furthermore, the invention includes various spontaneous and electrical imaging systems embodying the inventive compositions.

Recently there has been substantial interest in the discovery of more useful applications for the class of substances known as "liquid crystals." The name "liquid crystals" has become generic to materials which exhibit dual physical characteristics, some of which are typically associated with liquids and others which are typically associated with solids. Liquid crystals exhibit the mechanical characteristics, such as viscosities, which are normally unique to liquids. The optical characteristics of liquid crystals are more similar to those characteristics ordinarily found in the crystalline solid state. In liquids or fluids, the molecules are typically randomly distributed and oriented throughout the mass of the material. Conversely, in crystalline solids the molecules are generally rigidly oriented and arranged in a specific crystalline structure. Liquid crystals resemble solid crystals in that the molecules of the liquid crystalline compositions are regularly oriented in a fashion analogous to, but less extensive than, the molecular orientation and structure in a crystalline solid. Many substances have been found to exhibit liquid crystalline characteristics in a relatively narrow temperature range. Below that temperature range the substrates typically appears as crystalline solids, and above that temperature range they typically appear as isotropic liquids.

Liquid crystals are known to appear in three different mesomorphic forms: smectic, nematic, and cholesteric. In each of these structures, the molecules are typically arranged in a unique locally symmetrical orientation. In the smectic structure the molecules are arranged in layers with their major axes approximately parallel to each other and approximately normal to the planes of the molecular layers. In the nematic structure, the major axes of the molecules lie approximately parallel to each other, but the molecules are not organized into definite layers as in the smectic structure. In the cholesteric structure the molecules are arranged in definite layers, and within a given layer, the molecules are further arranged with their major axes approximately parallel to each other and parallel to the planes of the layers. In the cholesteric the direction of the major molecular axes is angularly displaced from one layer to the next, and the direction of these molecular axes traces out a helical path through adjacent layers of molecules. The cholesteric structure originally derived its name from the fact that materials exhibiting the cholesteric liquid crystalline mesophase structure are often molecules which are derivatives of cholesterol, or which are shaped very similarly to molecules of cholesterol.

Liquid crystals have been found to be sensitive or responsive to a variety of stimuli including temperature, pressure, foreign chemical compounds, and electric and magnetic fields, as disclosed, for example, in copending application Ser. No. 646,532, filed June 16, 1967; copending application Ser. No. 4,644, filed Jan. 21, 1970; French Pat. No. 1,484,584; Fergason Pat. Nos. 3,409,404 and 3,410,999; Fergason et al. U.S. Pat. No. 3,114,836, Waterman et al. U.S. Pat. No. 3,439,525, and Woodmansee U.S. Pat. No. 3,441,513. Most recently imaging systems wherein the imaging member comprises liquid crystalline material have been discovered and described for example in copending applications Ser. No. 821,565, filed May 5, 1969 now U.S. Pat. 3,652,148; Ser. No. 849,418, filed Aug. 12, 1969 now U.S. Pat. 3,655,971; Ser. No. 867,593, filed Oct. 20, 1969 now U.S. Pat. 3,642,348; and Ser. No. 104,348, filed Jan. 6, 1971 now U.S. Pat. 3,666,948.

Cholesteric liquid crystals are known to exhibit various observable alignment states commonly referred to as textures; for example, cholesteric liquid crystals may adopt a homeotropic, a focal-conic, or a Grandjean plane texture or alignment state as modifications within the cholesteric mesophase itself. Similarly, nematic liquid crystalline materials may be aligned parallel to the substrate, normal to the substrate (a nematic homeotropic texture), etc. See Gray, G.W., *Molecular Structure and the Properties of Liquid Crystals*, Academic Press, London, 1962, pages 39–54.

In new and growing areas of technology such as liquid crystals, new compositions of matter, methods, apparatus, and articles of manufacture continue to be discovered for the application of the new technology and the new modes. The present invention relates to new liquid crystalline compositions which cause films of such compositions to spontaneously align, and various systems for utilizing and providing images with such compositions.

SUMMARY OF THE INVENTION

It is, therefore, an object of this invention to provide novel compositions having liquid crystalline characteristics.

It is another object of this invention to provide a novel method of spontaneously aligning films of liquid crystals.

It is another object of this invention to provide novel liquid crystalline compositions having cholesteric liquid crystalline optical characteristics.

It is another object of this invention to improve the characteristics of systems using the cholesteric-nematic phase transformation.

It is still another object of this invention to provide compositions particularly suited for transforming optically uniaxial nematic compositions to optically biaxial nematic compositions.

It is yet another object of this invention to provide novel liquid crystalline imaging systems.

The foregoing objects and others are accomplished in accordance with this invention by providing novel liquid crystalline compositions containing an advantageous aligning agent, which causes said compositions, upon application to any suitable substrate to spontaneously align or to have a greater tendency to become aligned in an orientation wherein major axes of the molecules comprising liquid crystalline material are substantially perpendicular to the plane of the substrate. Such liquid crystalline compositions are particularly suited for use in phase transition systems wherein a film comprising cholesteric liquid crystalline material having the tendency to align is transformed to the nematic liquid crystalline state by the application of electrical fields of sufficient field strengths. Such compositions are also used in other liquid crystalline imaging systems making use of differentially aligned portions of liquid crystalline films.

BRIEF DESCRIPTION OF THE DRAWING

For a better understanding of the invention as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

In the instant invention it has been discovered that novel liquid crystalline compositions which, in addition to their predominantly liquid crystalline constituent contain an advantageous aligning agent which possesses the advantageous property that upon application of a film of such composition to a suitable substrate, the liquid crystalline composition spontaneously becomes aligned and has a greater tendency to become aligned in an orientation wherein the major axes of the molecules comprising the liquid crystalline material substantially normal to the plane of the substrate.

It is believed that the presence of the advantageous aligning agent, and not the influence of the substrate alone, is responsible for this surprising and advantageous result.

Figure 1:
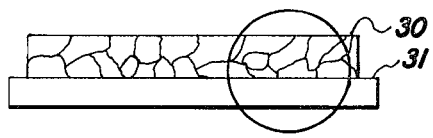
FIG. 1 is a partially schematic, cross-sectional view of a layer of liquid crystals on a substrate.
Figure 1A:
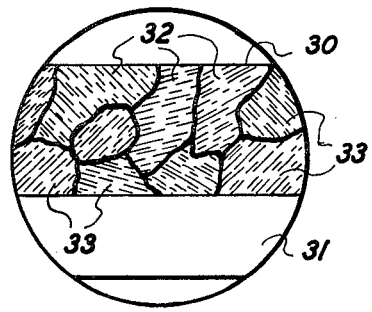
FIG. 1A is a magnification of a portion of the view of FIG. 1.

For example, FIG. 1 illustrates in partially schematic, cross-sectional view (which is not necessarily illustrated in proper proportions), a layer of liquid crystalline material 30 on a suitable substrate 31, and FIG. 1A is a magnification of the encircled portion of the view shown in FIG. 1. In FIG. 1A it is clear that the liquid crystalline material comprising the layer 30 itself comprises a number of adjacent domains 32, and that within each domain 32, the individual molecules 33 are in a unique locally symmetrical orientation which is characteristic of one of the mesomorphic liquid crystalline states. For purposes of illustration, the molecules 33 in FIGS. 1 and 2 are arranged in the locally symmetrical orientation which is characteristic of the orientation of the molecules in the nematic liquid crystalline state, although, as will be discussed below, other liquid crystalline materials in compositions including the advantageous aligning agent of the present invention behave in a fashion similar to that illustrated in FIG. 1A.

Figure 2:
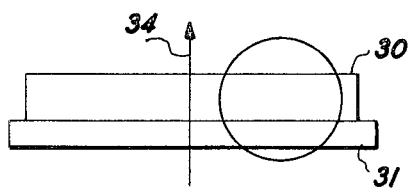
FIG. 2 is a partially schematic, cross-sectional view of a layer of the novel liquid crystalline composition of the instant invention on a suitable substrate.
Figure 2A:
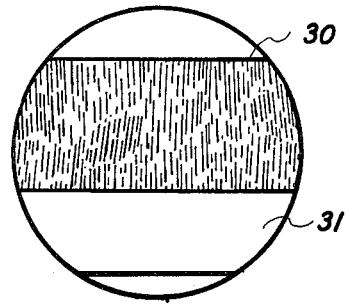
FIG. 2A is a magnification of a portion of the view of FIG. 2.

In FIG. 2, and particularly in FIG. 2A, a layer of liquid crystalline composition including the advantageous aligning agent of the instant invention is illustrated wherein any boundaries between the domains of molecules of the liquid crystalline material having the locally symmetrical orientation are much less definite, and the majority of the individual molecules in the entire layer of liquid crystalline material are aligned with their major axes substantially normal to the plane of the substate. This direction is schematically shown in FIG. 2 by the arrow 34. It is noted that the advantageous aligning agent of the instant invention is not specifically illustrated in FIG. 2 and FIG. 2A. However, these aligning agents are typically present in such small amounts that the illustration of their effect on the molecules of the liquid crystalline material is sufficient to indicate their presence in the advantageous composition of the instant invention as schematically illustrated in FIGS. 2 and 2A.

The advantageous "aligning agent" of the present invention may comprise and is herein defined to mean any suitable material which, when added to liquid crystalline compositions causes the liquid crystalline material containing such an aligning agent, upon application to a suitable substrate, to spontaneously align in an orientation wherein the major axes of the molecules comprising the liquid crystalline material are substantially perpendicular to the plane of the substrate, or causes the molecules of the liquid crystalline material to have a greatly increased tendency to align in that orientation.

The advantageous aligning agents suitable for use in the instant invention include a wide variety of chemical compounds including including a variety of resins and surfactants (surface active agents). Resins suitable for use as aligning agents include polyamide resins, for example, Versamid 100, a polyamide resin available from General Mills, Inc.; and other Versamid resins such as Versamid 115, 125 and 140; epoxy resins such as Easypoxy (part 2), available from Conap, Inc.; Dow's Novolac phenol-formaldehyde resins; Polyscience's Resin DER 334; CATALYST "9" available from Emerson & Cuming; Marson's Fiberglass Epoxy; Dupont's Elvacite 2046, an n-butylisobutyl methacrylate copolymer; and other various types of resins including resins and resinous derivatives of fatty oils and acids, phenoplasts, aminoplasts, aliphatic amines, glycidyl ethers, polyglycols including amine-terminated and epoxy terminated polyglycols, polyols, polysulfides, and others.

Other materials which are sometimes identified as surfactants (surface active agents) are also suitable as the advantageous aligning agent in the instant invention. Such surfactants include esters of polyhydric alcohols, alkoxylated amides, esters of polyoxypropylene glycols, ethers of polyoxyalkylene glycols, alkylphenyl ethers, tertiary acetylenic glycols, polyoxyethylated alkyl phosphates, carboxylic acids, soaps, sulfonated hydrocarbons and their salts, sulfonated esters, salts, sulfonated amides, and their salts, sulfonated amines, and their salts, sulfonated ethers, and their salts, sulfonated carboxylic acids, and their salts, sulfonated phenols, sulfonated lignins, acylated amino acids, acylated polypeptides, phosphates and phosphatides, alkyl polyphosphates, amines and their salts, trialkylamine oxides, polyoxyethylated long-chain amines, quaternary ammonium salts (such as tetraalkyl-trialkylaryl-polyethoxyethyl-ammonium salts), acylated polyamines, and their salts, heterocyclic amines, alkylolamine-fatty acid condensates (i.e., oxazolines), alkyl phosphonamides, amphoterics such as: cetyl betaine, or sodium N-lauryl-myristyl-B-aminopropionate, sequestrants such as: sodium dihydroxyethylglycinate, or trisodium nitrilotriacetate, and many others.

The above lists of suitable aligning agents are representative of materials suitable for use in the instant invention, and are not intended to be exhaustive or limiting.

The advantageous aligning agents of the present invention are typically added to the liquid crystalline material in amounts in the range between about 0.1 and about 10% by weight, which amounts are typically sufficient to facilitate the advantageous spontaneous alignment.

The advantageous compositions of the instant invention may be prepared by dissolving the liquid crystalline materials or mixtures thereof along with the advantageous aligning agent in a suitable solvent, for example organic solvents such as chloroform, trichloroethylene, tetrachloroethylene, petroleum ether, methylethyl ketone, isopropanol, toluene, and others. The solution containing the liquid crystalline material and the advantageous additive is then typically poured, sprayed, or otherwise applied to a suitable substrate. After evaporation of the solvent, a thin layer of liquid crystal containing the aligning agent remains on the substrate. Alternatively, the liquid crystalline materials along with the aligning agent may be combined and directly applied to a suitable substrate by heating the mixed components above the isotropic transition temperature of the liquid crystalline components, and mixing the components before application to the substrate. Room temperature liquid crystals may be used in their natural room temperature condition with the advantageous aligning agent mixed therein. In embodiments of the present invention where such liquid solutions or compositions are used in electro-optic cells, such compositions may be injected into position in such electro-optic cells. Many compositions suitable for use herein may have viscosities such that the composition layer may have sufficient integrity to be self-supporting on the substrate regardless of the orientation of the substrate.

The liquid crystal layers or films suitable for use in the present invention are preferably of a thickness in the range of about 250 microns or less, although thicker films may perform satisfactorily in some embodiments of the instant invention.

As discussed above herein, nematic liquid crystalline materials, smectic liquid crystalline materials, and even cholesteric liquid crystalline materials, or mixtures thereof, are suitable for use in the advantageous compositions and various embodiments of the instant invention. Layers or films of liquid crystalline materials typically appear in a non-aligned state wherein the unique direction of the local symmetry within small domains is randomly different from one domain to another. However, the presence of the advantageous additives of the instant invention causes the unique direction of the local symmetry of the various domains to substantially align, or to increase their tendency to align, so that the liquid crystalline composition spontaneously aligns or tends to align in an orientation wherein the major axes of the molecules are substantially normal to the plane of the substrate.

Where the liquid crystalline material is nematic the material spontaneously aligns in the nematic homeotropic state wherein the major axes of the molecules are substantially normal to the plane of the substrate and consequently, the optic axis of the liquid crystal material is also normal to the plane of the substrate. This effect is illustrated in FIGS. 1, 1A, 2 and 2A. Where nematic liquid crystalline materials are used in combination with the advantageous aligning agents of the instant invention, any suitable nematic liquid crystal, mixture or composition comprising nematic liquid crystals or composition having nematic liquid crystalline characteristics may be used. Such nematic liquid crystalline materials include p-azoxyanisole, p-azoxyphenetole, p-butoxybenzoic acid, p-methoxycinnamic acid, butyl-p-anisylidene-p-aminocinnamate, anisylidene para-amino-phenylacetate, p-ethoxybenzylamino-a-methyl-cinnamic acid, 1,4-bis(p-ethoxy benzylidene) cyclohexanone, 4,4'-dihexyl-oxybenzene, 4,4'-diheptyloxybenzene, anisal-p-amino-azo-benzene, anisaldazine, a-benzeneazo- (anisal-α'-naphthylamine), n,n'-nonoxybenzetoluidine; anils of the generic group (p-n-alkoxybenzylidene-p-n-alkylanilines), such as p-methoxy-benzylidene-p'-n-butylaniline; nematic compounds of the alkoxybenzylidene-aminoalkylphenone group, such as methoxybenzylidene-amino-butyrophenone and methoxybenzylidene-amino-valerophenone; mixtures of the above and others.

Smectic liquid crystalline materials are suitable for use in compositions and systems of the instant invention, and their behavior is believed to be similar to the behavior of nematic liquid crystalline compositions including the advantageous aligning agents of the instant invention. Smectic liquid crystalline material suitable for use in the instant invention include: n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of 7 or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids, ethyl-p-azoxy-cinnamate; ethyl-p-4-ethoxybenzylidene-aminocinnamate; ethyl-p-azoxybenzoate; potassium oleate; ammonium oleate; p-n-octyloxy-benzoic acid; the low temperature mesophase of 2-p-n-alkoxy-benzylideneamino-fluorenones with chain length of 7 or greater; the lower temperature mesophase of p-(n-heptyl)oxybenzoic acid; anhydrous sodium stearate; thallium (I) stearate; mixtures thereof and others.

Surprisingly, even cholesteric liquid crystalline materials, wherein the unique local symmetry of the molecules is such that the direction of the major axes is angularly displaced from one layer of molecules to the next, are affected by the addition of the advantageous aligning agents of the instant invention. While it is not practically possible for the aligning agents alone to transform the cholesteric molecular arrangement into an aligned state resembling the aligned nematic state, it has been found, surprisingly, that the presence of the advantageous aligning agents of the instant invention facilitate the electrical phase transformation of an initially cholesteric liquid crystalline state into the nematic liquid crystalline state. This phase transformation system is discussed in detail below herein. Any suitable cholesteric liquid crystalline material or mixture or composition comprising liquid crystals having cholesteric liquid crystalline characteristics may be used in the compositions and systems of the instant invention. Cholesteric liquid crystalline materials suitable for use in the instant invention include derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl chloro-formate; cholesteryl propionate; cholesteryl acetate; cholesteryl valerate; cholesteryl vaccenate; cholesteryl linoleate; cholesteryl linolenate; cholesteryl oleate; cholesteryl erucate; cholesteryl butyrate; cholesteryl caprate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy)ethyl carbonate; cholesteryl-2-(2-butoxyethoxy) ethyl carbonate; cholesteryl-2-(2-methoxyethoxy) ethyl carbonate; cholesteryl heptyl carbamate; and alkyl amides and aliphatic secondary amines derived from 3 $\beta$ -amino- $\Delta$ 5-cholestene and mixtures thereof; peptides such as cholesteryl poly- $\gamma$ -benzyl- $l$ glutamate derivatives of beta sitosterol such as sitosteryl chloride; and active amyl ester of cyanobenzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable cholesteric liquid crystalline materials in the advantageous compositions and systems of the present invention.

The above lists of materials exhibiting various liquid crystalline phases are not intended to be exhaustive or limiting. The lists disclose a variety of representative materials suitable for use in the advantageous compositions and systems of the instant invention.

The substrate upon which the advantageous compositions of the instant invention spontaneously align may comprise any suitable material, and in various embodiments, may be in any desired form, shape, or orientation. For example, substrate may comprise electrically conductive materials such as copper, brass, aluminum, steel, cadmium, silver, gold, tin, or others. Similarly, the substrate may comprise electrically insulating material such as glass, plastic, papers, ceramics, or other suitable insulators. In still other substrates, a conductive substrate may be coated onto an insulator, for example, NESA glass, which is a partially transparent tin oxide coated glass which is available from Pittsburgh Plate Glass Co. Another such substrate comprises aluminized Mylar made up of a Mylar polyester film available from DuPont, having a thin, semi-transparent aluminum coating. Another such substrate comprises Mylar coated with copper or copper iodide. In addition to these representative substrate materials, any other suitable material may be used.

In another preferred embodiment of the advantageous system of the present invention the novel compositions which spontaneously align may be overcoated with any suitable material, typically a transparent material, or may be sandwiched between two layers of any desired material. For example, a spontaneously aligned or spontaneously alignable composition on a suitable substrate may be overcoated with a material such as Tedlar, a polyvinyl fluoride, available from DuPont; polyethylene film; polyvinylchloride film; Mylar, a polyester resin film available from DuPont, thin glass plates and sheets, mixtures thereof and others. Such overlayers are typically transparent films.

In the modes of the instant invention where the liquid crystalline compositions actually spontaneously align when placed on a substrate, for example a nematic material doped with an advantageous aligning agent, visual differences appear in the liquid crystalline material in either reflected or transmitted light. For example the nematic material in the aligned state is more transparent than in the non-aligned state, and contrast between aligned and non-aligned portions of a layer of liquid crystalline material may be enhanced with polarizers or other contrast enhancing means.

Figure 3:
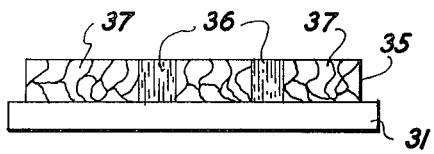
FIG. 3 is a partially schematic, cross-sectional view of an imaging member having imagewise portions comprising the novel liquid crystalline compositions of the instant invention.
Figure 4:
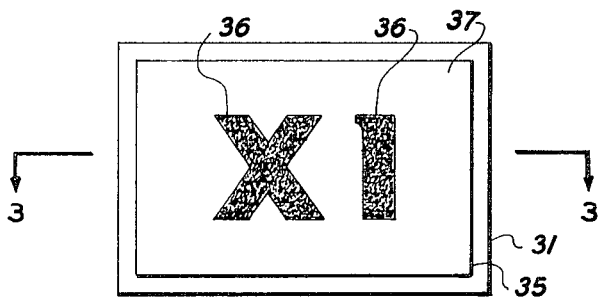
FIG. 4 is a partially schematic top view of the imaging member illustrated in cross section in FIG. 3.
Figure 5:
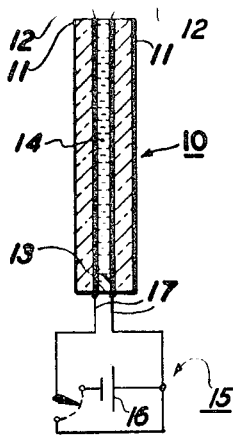
FIG. 5 is a partially schematic, cross-sectional view of a liquid crystalline electro-optic cell.
Figure 6:
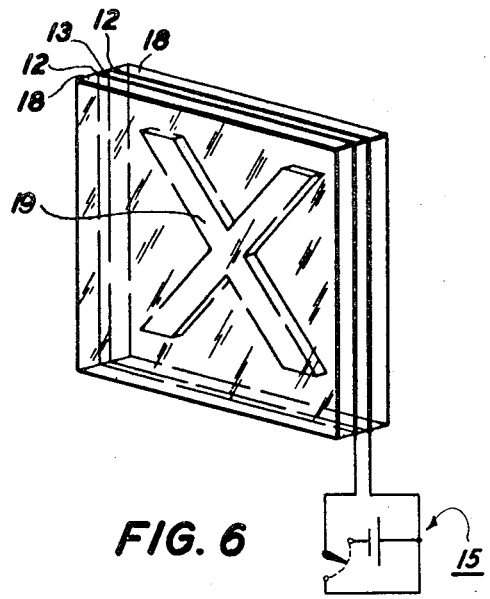
FIG. 6 is a partially schematic isometric view of an embodiment of a liquid crystalline electro-optic imaging cell wherein the desired image is defined by the shape of the liquid crystalline material as confined by the shape of the spacing member.
Figure 7:
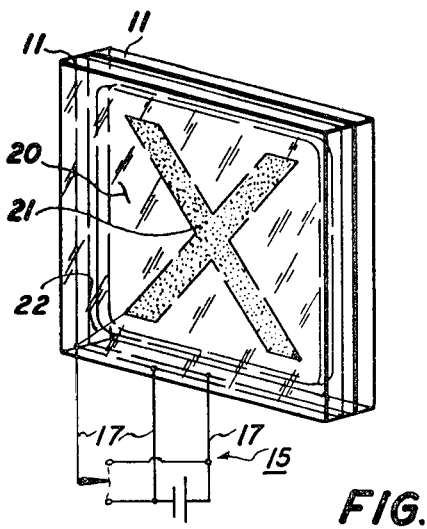
FIG. 7 is a partially schematic isometric view of an embodiment of a liquid crystalline electro-optic imaging cell wherein the desired image is defined by the shape of at least one of the electrodes.
Figure 8:
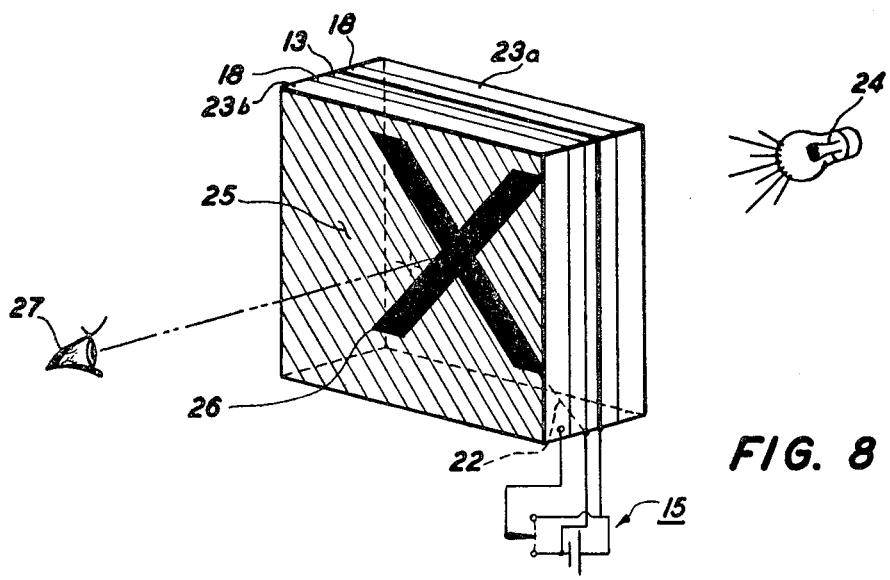
FIG. 8 is a partially schematic isometric view of an embodiment of a liquid crystalline electro-optic imaging cell between polarizers.

The differentially optically reflective and transmissive properties of spontaneously aligned and non-aligned portions of a layer of liquid crystalline composition may comprise an imaging system. For example, the imaged member illustrated in FIGS. 3 and 4 comprises substrate 31 supporting liquid crystalline layer 35 comprising imagewise portions 36 which include the advantageous aligning agent of the instant invention, and background portions 37 which are in a non-aligned state. Such imagewise layers of liquid crystals may also be used in liquid crystalline electro-optic cells to light, enhance, or color such images. For example these liquid crystalline compositions may be used in conjunction with photoconductive substrate as shown in co-pending application Ser. No. 51,258, filed June 30, 1970 now U.S. Pat. 3,671,231. The inventive compositions also provide heretofore unknown advantages in liquid crystalline electro-optic cells, for example like the ones illustrated in FIGS. 5–8.

Among the effects known to be useful in such electro-optic liquid crystalline cells are dynamic scattering in nematic liquid crystalline compositions, temporary color changes (pitch changes) in cholesteric liquid crystalline materials; texture transition effects in cholesteric liquid crystalline materials; and even cholesteric-nematic phase transition effects in initially cholesteric liquid crystalline materials. In various embodiments of these and other liquid crystalline electro-optic systems, the ability to spontaneously align the liquid crystalline material before the use of the electro-optic effects, can produce novel and advantageous results. For example, a layer of nematic liquid crystalline material which is initially optically uniaxial with the optic axis normal to the plane of the layer may have an electrical field applied perpendicular to the optic axis of the composition layer thereby inducing optical biaxiality in the liquid crystalline composition. This effect is discussed at length in copending application Ser. No. 104,328, filed Jan. 6, 1971 now U.S. Pat. 3,687,515, the entire disclosure of which is hereby expressly incorporated by reference in the instant application.

Similarly, the increased tendency of films of cholesteric liquid crystalline materials to align is highly desirable in reducing the total electrical energy necessary for producing the advantageous cholesteric-nematic phase transformation in initially cholesteric liquid crystalline materials. The advantageous phase transformation is described in great detail in copending application Ser. No. 821,565, filed May 5, 1969 now U.S. Pat. 3,652,148, the entire disclosure of which is hereby expressly incorporated by reference in the instant application. As discussed earlier herein, pure cholesteric materials containing the advantageous aligning agents typically do not spontaneously align, but their reduction of the total energy needed to perform the cholesteric-nematic phase transition clearly indicates the increased tendency of these novel compositions to align.

The following examples specifically define the present invention with respect to novel liquid crystalline compositions and alignment systems. The parts and percentages in the disclosure, examples and claims are by weight unless otherwise indicated. The examples are intended to illustrate various preferred embodiments of the inventive system for providing novel liquid crystalline compositions and aligning such liquid crystalline compositions spontaneously on a suitable substrate.

EXAMPLE I

A nematic liquid crystalline mixture comprising p-methoxy-benzylidine-p'-n-butylaniline (hereafter ABUTA) is doped with about 0.5% Versamid 100, a polyamide resin available from General Mills, Inc., and this composition is spread on a thin film on a standard microscope slide. The nematic liquid crystalline composition containing the aligning agent spontaneously aligns in a nematic homeotropic texture wherein the major axis of the molecules comprising the nematic liquid crystalline material are substantially perpendicular to the plane of the substrate.

EXAMPLES II, III & IV

A nematic liquid crystalline composition comprising ABUTA as in Example I is doped with about 1% of Versamid resins 15, 125, 140, available from General Mills, Inc., and the three separate samples spontaneously aligned as in Example I.

EXAMPLES V-XII

In Examples V-XII, a thin line of the specific aligning agent is placed on a microscope slide, and a drop of ABUTA is placed over the thin line of the aligning agent thereby allowing the agent and the nematic liquid crystalline material to mix at their interface to an extent not greater than about 10% by weight of the aligning agent.

V. Easypoxy (Part II), an epoxy resin available from CONAP, Inc.

VI. Catalyst "9," an epoxy resin available from Emerson & Cuming.

VII. Novalac, phenyl-formaldehyde resin available from Dow Chemical Company.

VIII. Resin DER 334, an epoxy resin available from Polysciences.

IX. Fiber glass epoxy, available from Marson's.

X. Elvacite 2046, an n-butyl/isobutyl methacrylate copolymer available from DuPont.

XI. Diethylenetriamine, T4573, available from Eastman Chemicals.

XII. Triethylenetetraamine, P4572, available from Eastman Chemicals.

In each case the liquid crystalline material doped by the aligning agent assumes the aligned orientation wherein major axis of the molecules comprising nematic liquid crystalline material are substantially perpendicular to the plane of the substrate.

EXAMPLES XIII-XXXI

A thin line of each one of the surfactant type aligning agents is placed on a standard microscope slide and a drop of ABUTA placed on the line of the aligning agent.

XIII. Sulfated nonylphenyl ether tetraethylene glycol ammonium salt.

XIV. Polyoxyethylated nonyl phenol (alkylphenyl ether)

XV. Zinc naphthenate

XVI. Cobalt naphthenate

XVII. Sulfated nonylphenyl ether tetraethylene glycol NH$_4$ salt, ALIPAL CO-436, available from GAF.

XVIII. Polyoxyethylated nonyl phenol (alkylphenyl ether) Gepal Co-630, available from GAF.

XIX. Zinc naphthenate

XX. Cobalt naphthenate

XXI. Polyoxyethylated lauric acid, aldosperse L-9, available from Glyco Chemical, Inc.

XXII. Diethylene Glycol Monolaurate, Pegosperse 100 ml, available from Glyco Chemical, Inc.

XXIII. Diethylene Glycol Monooleate, Pegosperse 100, available from Glyco Chemical, Inc.

XXIV. N-polyethoxylated Coco amine, ethomeen C/25, available from Armour Ind. Chem. Co.

XXV. Surfynol 104, a tertiary acetylenic glycol, available from Air Red. Chem. Co.

XXVI. Arlacel 186, a tertiary acetylenic glycol, available from Atlas Chemical Ind.

XXVII. Atlas G3300, a tertiary acetylenic glycol, available from Atlas Chemical Inc.

XXVIII. Nonylphenoxypoly(ethylenoxy) ethanol.

XXIX. Sulfated polyoxyethylated nonylphenol sodium salt.

XXX. Polyoxyethylated nonylphenol

XXXI. FC J46, a fluorochemical compound, available from Minn. Mining & Mfg. Co.

EXAMPLE XXXII

A liquid crystalline electro-optic cell is prepared by first preparing a mixture of liquid crystalline materials comprising about 35% cholesteryl chloride and about 65% of a mixture of p-ethoxy-benzylidene-p'-n-butylaniline (EOBUTA) and p-butoxy, benzylidene-p'-n-butylaniline (BOBUTA), which is a mixture of materials which has cholesteric liquid crystalline characterics. Four parts of this mixture and then mixed with one part of a composition comprising ABUTA are about 2½ percent of the aligning agent Versamid 100, a polyamide resin available from General Mills, Inc. A layer of the aligning agent doped cholesteric liquid crystalline mixture is placed between and in contact with a pair of substantially transparent electrodes of tin oxide coated glass. The transparent electrodes are separated by an about one-half ml thick Tedlar (polyvinyl fluoride, commercially available from DuPont) spacer and the electrodes are connected in circuit with an electrical generator. When an electrical field provided by placing a voltage of about 275 volts D.C. is placed across this sample, the electrical field-induced cholesteric-nematic phase transition occurs, as described in copending application Ser. No. 821,565, filed May 5, 1969.

As a control cell, a second cell having the same component mixture without the Versamid 100 aligning agent is used, and it is found that the electrical field-induced cholesteric-nematic phase transition threshold voltage is about 400 volts D.C. It is therefore clear that the addition of the advantageous aligning agent of the instant invention is significantly reduced the total electrical energy necessary to achieve the cholesteric-nematic phase transition.

Although specific components, proportions, arrangements, and conditions, have been stated in the above description of preferred embodiments of this invention, other suitable materials and procedures such as those listed above, may be used with satisfactory results, and variations in the system may be made to synergize, enhance, or otherwise modify the properties of or increase the uses for the inventive system. It will be understood that such other changes in the details, materials, steps, arrangements of parts and uses which have been herein described and illustrated in order to explain the nature of the invention will occur to and may be made by those skilled in the art upon a reading of this disclosure, and such changes are intended to be included within the principle and scope of this invention.

What is claimed is:

1. The method of providing a spontaneously aligned liquid crystalline film comprising
    providing a substrate, and
    providing on said substrate a layer of liquid crystalline composition comprising a nematic liquid crystalline material having dispersed throughout an aligning agent, said aligning agent comprising a polyamide resin surfactant material, whereby said liquid composition spontaneously aligns with the major molecular axes of a substantial portion of the molecules of the liquid crystalline material substantially perpendicular to the plane of the substrate.

2. The method of claim 1 wherein the composition provided on the substrate comprises the aligning agent in an amount in the range of about 0.1 to about 10 percent by weight of the total composition.

3. The method of claim 1 wherein the layer of liquid crystalline composition is provided in a thickness of not greater than about 250 microns.

4. The method of claim 1 wherein said layer of liquid crystalline composition is further provided with an overcoating layer.

5. The method of claim 4 wherein said overcoating is substantially transparent.

6. The method of claim 1 wherein the liquid crystalline material provided on the substrate comprises a mixture of cholesteric and nematic liquid crystalline materials.

* * * * *

UNITED STATES PATENT OFFICE
CERTIFICATE OF CORRECTION

Patent No. 3,803,050      Dated March 26, 1974

Inventor(s) Werner E. L. Haas et al.

It is certified that error appears in the above-identified patent and that said Letters Patent are hereby corrected as shown below:

The term of this patent subsequent to Aug. 29, 1989, has been disclaimed.

Signed and sealed this 1st day of April 1975.

(SEAL)
Attest:

RUTH C. MASON
Attesting Officer

C. MARSHALL DANN
Commissioner of Patents
and Trademarks